S. J. COX.
RACK FOR UMBRELLAS AND OTHER ARTICLES.
APPLICATION FILED MAY 1, 1912.
1,050,519.
Patented Jan. 14, 1913.
2 SHEETS—SHEET 1.
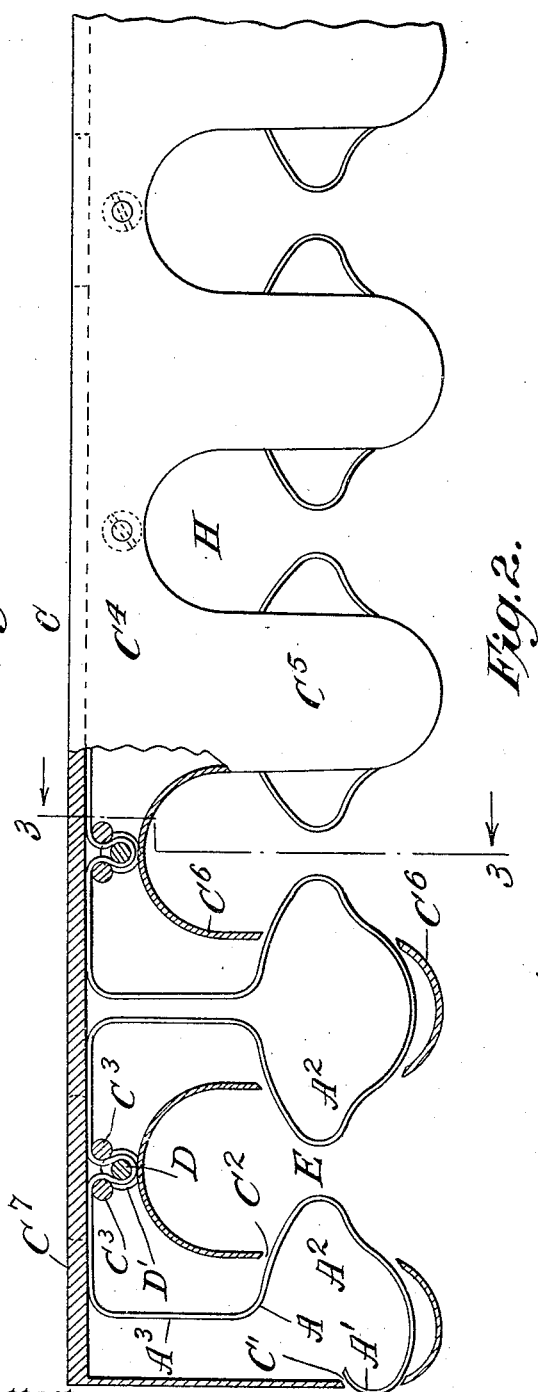
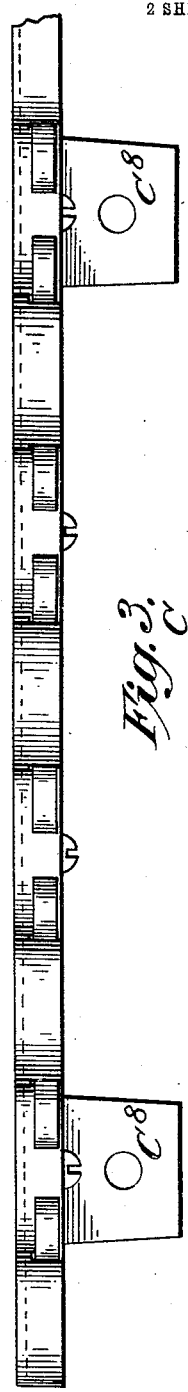
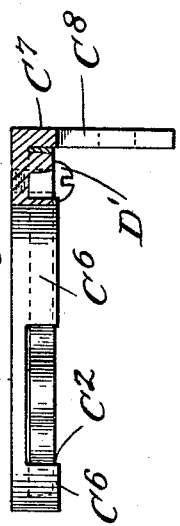
Attest:
Stephen J. Cox,
Inventor S. J. COX.
RACK FOR UMBRELLAS AND OTHER ARTICLES.
APPLICATION FILED MAY 1, 1912.
1,050,519.
Patented Jan. 14, 1913.
2 SHEETS—SHEET 2.
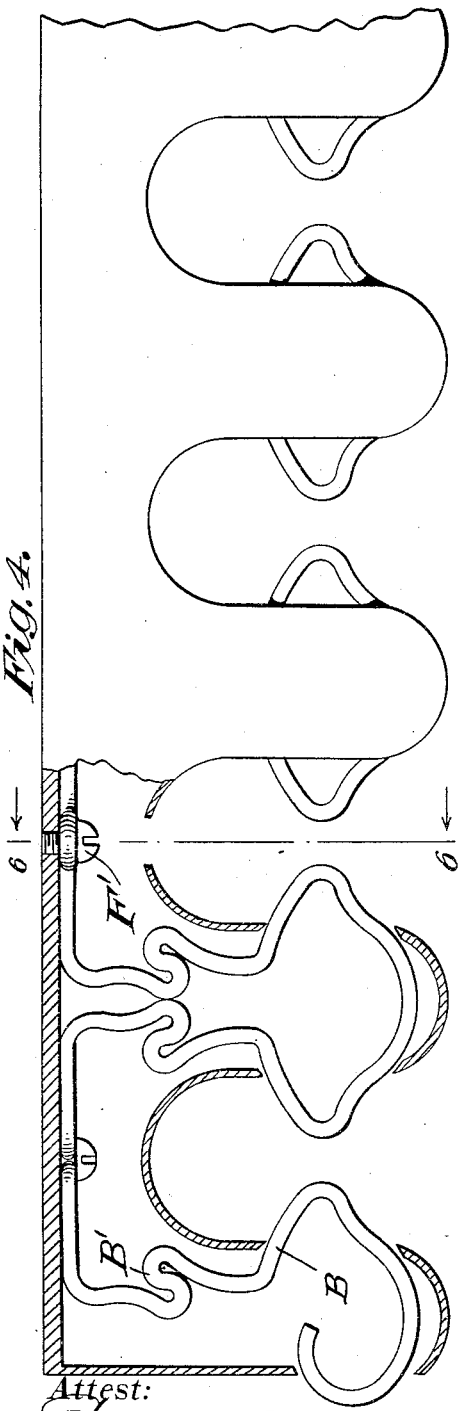
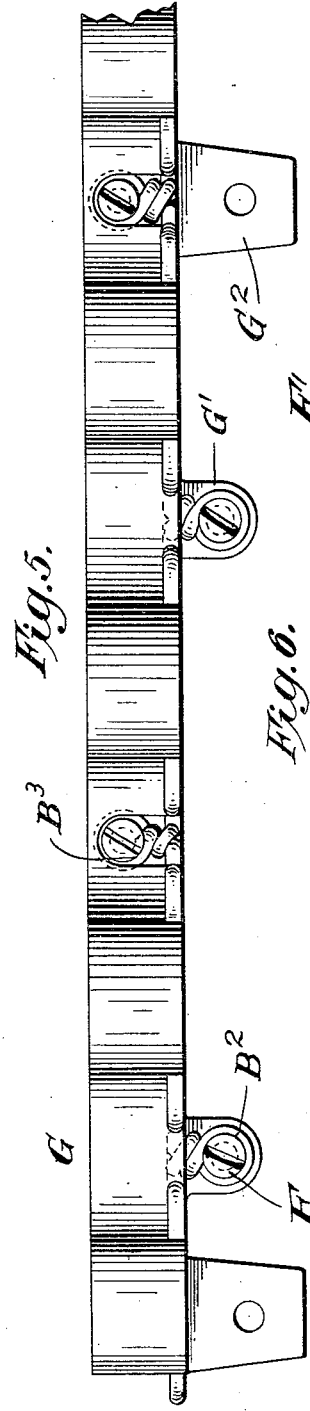
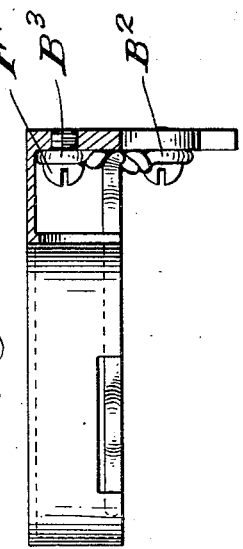
Attest:
Stephen J. Cox,
Inventor

UNITED STATES PATENT OFFICE.

STEPHEN J. COX, OF CRANFORD, NEW JERSEY, ASSIGNOR TO LEON MANN, OF BROOKLYN, NEW YORK.

RACK FOR UMBRELLAS AND OTHER ARTICLES.

1,050,519. Specification of Letters Patent. Patented Jan. 14, 1913.

Application filed May 1, 1912. Serial No. 694,517.

*To all whom it may concern:*

Be it known that I, STEPHEN J. COX, a citizen of the United States, and a resident of Cranford, in the county of Union and State of New Jersey, have invented certain new and useful Improvements in Racks for Umbrellas and other Articles, of which the following is a specification.

The invention relates to devices for automatically holding umbrellas, canes and other articles, and its objects are, among others, to produce a device of this character of simple, strong and durable construction and reliable operation, which may be manufactured at a moderate cost, may be varied in external appearance and made attractive and ornamental to suit the taste of the purchaser and may be made up in various sizes and in a series of any desired number of holders.

The invention consists in the construction, combination and arrangement of parts hereinafter described and claimed, and illustrated in the accompanying drawings forming a part hereof.

In said drawings, Figure 1 is a plan of a holder embodying the improvements with a portion of the upper casing broken away to expose the parts beneath it. Fig. 2 is a front edge view of the same. Fig. 3 is a vertical section on the line 3—3 of Fig. 1 looking in the direction indicated by the arrows. Figs. 4, 5 and 6 are views similar to Figs. 1, 2 and 3 respectively of a modification.

I am aware that many devices designed for the purpose for which the present improvements are intended have been devised, but I believe that they are all open to one or more of the objections which the present improvements are designed to overcome. Thus, some of the prior devices are extremely complicated and expensive and, therefore, cannot be made and sold for general use, others are too frail, or if not too frail too clumsy, while still others are made of so many different and carefully adjusted parts that they would soon get out of order and become useless. So far as I am aware the strength, simplicity and durability of the present improvements have not been approached by any of these prior devices, and these qualities reside in the peculiar construction and arrangement of the parts.

Not only is the present invention designed to fulfil the need that prior devices have failed to fill, but it is adapted to be used for various other purposes than the holding of canes, umbrellas and the like. Thus, without material change, it may be used to hold whips, billiard cues, tools, and various articles of merchandise displayed for sale or stored, and in this connection will be found a valuable adjunct of the display window and the salesroom.

The spring metal ribbon A is provided with a curved extremity A', the convex side of which is in the opening C' of the casing C, and from this extremity it is bent in the form of an ogee curve $A^2$ extending through the opening $C^2$ of the casing, and then curved backwardly again within the casing to the shank $A^3$ which extends on a straight line to the back of the casing. The ribbon is then bent at substantially right angles to the shank $A^3$ and extends parallel with the casing until it reaches the studs $C^3$ and the screw-bolt D where it is bent into a loop passing between the studs $C^3$ and around the said screw-bolt D. In this manner the spring ribbon is securely held in position and prevented from having lateral movement. Each of the spring jaws E is composed of two of the projecting portions $A^2$ of the ribbon, opposite one another, and the series of springs—which may be of any desired number—is made of one continuous strip of ribbon bent and secured in the manner described.

To stiffen the springs and prevent them from having lateral movement or becoming displaced, as well as for ornamental or other purposes, the casing C is provided. This consists of a flat top-plate $C^4$ divided into fingers $C^5$ projecting slightly beyond the springs and provided with a depending flange $C^6$ having cutaway portions, which form the opening $C^2$ permitting the opposing springs forming the jaws E to project therethrough. There is a depending portion $C^7$ running along the back edge of the plate $C^4$ and from this at intervals extend flanges C⁵ provided with apertures for the reception of screws, nails or other fastening devices. The bolt D has a large head D¹ which overlaps the loop of the spring ribbon A and also the edges of the studs C³, and as this bolt is threaded into the upper plate C⁴ it will hold the loop firmly between the said plate and its head, thus preventing both lateral and vertical displacement.

It will be seen that the rack is made substantially in two pieces, one piece consisting of the spring ribbon A bent as described and shown, and the other of the plate C⁴ with its depending flanges, which may be cast in one piece. In assembling the parts it is only necessary to invert the casing, place the spring A in position and secure it by means of the screw-bolts D, and as the springs may be formed by bending the metal ribbon into the form shown and then tempering it and the casing cast in one piece, as above stated, a structure of extreme simplicity, strength and durability is thus provided for at a minimum of cost.

In the modification of Figs. 4, 5 and 6 a spring wire B is used instead of a ribbon, and in order to give the spring jaws greater resiliency a reversed curve B¹ is provided in the shank of each spring. The form of the spring is otherwise substantially the same, except that the means for fastening the spring wire to the casing are vertically disposed loops B² and B³, the former extending downwardly and the latter upwardly. These loops are adapted to receive screw-bolts F similar to the bolts D, and threaded into the back of the casing G or the depending lug G¹, as the case may be. The depending portions of the casing G are deeper than the similar portions of the casing C, in order to accommodate the wire, but otherwise the casing is substantially the same. It is also provided with flanges G² with openings for the reception of fastening means.

It will be observed that with the form shown in Figs. 4, 5 and 6 the casing is not essential, since it is only necessary to fasten the spring wire to a wall or other rigid part by means of screws or other fastenings passing through the loops B² and B³, and that the holding device thus formed will be strong and serviceable, while the weight and expense of the casing are dispensed with. The casing, therefore, is not a necessity when the springs are made of wire or metal of other cross-sectional form which can be bent into the form shown in Figs. 4, 5 and 6. The casing, however, adds a certain amount of strength and rigidity to the holder and affords an opportunity for ornamentation.

In operation, an umbrella—for instance— is forced into the space H by having its handle pressed through the spring jaws, where it will remain until it is drawn out again through these jaws. When the handle of the umbrella is forced through the jaws they will yield in opposite directions to a sufficient extent to admit its passage and will immediately return to their normal position. The jaws, however, are guarded against too great a strain by the depending flanges C⁶ through the opening C² of which they project, and in this manner they are prevented from being bent out of shape when subjected to extraordinary strain. If desired a bottom plate may be provided for the casing, but this is not necessary or even desirable in the construction of holders for ordinary purposes.

It will be understood that the spring portions may take various forms and that the metal of which these spring portions are formed may be subdivided, also that other changes in details of construction may be made, without departing from the spirit of the invention.

What I claim is:

1. In a device of the character described, a supporting member having a plurality of pins or studs, a spring member connected with said supporting member by means of said pins or studs and held against free movement by being passed between two of said pins or studs and around one of them so as to bear against the sides thereof, said spring member also having a plurality of integral portions extending away from said pins or studs and turned toward one another to form a spring jaw which is held against opening except to the extent permitted by the resiliency of the metal by the said pins or studs.

2. In a device of the kind described, a supporting member having a plurality of spaced sets of pins or studs, each set comprising three pins, and a spring member having, for each set, portions passing between two of the pins and around the third, one of said pins being removable.

3. In a device of the kind described, a supporting member having a plurality of spaced sets of pins or studs, each set comprising three pins, and a spring member having, for each set, portions passing between two of the pins and around the third, one of said pins being removable, said removable pin being provided with means to prevent movement of the spring member axially of the pins.

4. In a device of the character described, a supporting member having a set of pins or studs, one of said pins or studs being removable, and a spring member having a portion passing between two of the pins and around one of them, said spring member being provided with spring loop portions, each loop portion having a part opposed to a corresponding part of the adjacent loop whereby each loop coöperates with the adjacent loop on each side, as and for the purpose stated.

Witness my hand this 22nd day of April 1912, at the city of New York, in the county and State of New York.

STEPHEN J. COX.

Witnesses:
E. W. SCHERR, Jr.,
MARY H. LEWIS.

Copies of this patent may be obtained for five cents each, by addressing the "Commissioner of Patents, Washington, D. C."